US009136665B1

(12) United States Patent  
Tankhilevich et al.

(10) Patent No.: US 9,136,665 B1  
(45) Date of Patent: Sep. 15, 2015

(54) USING TUNNEL JUNCTION AND BIAS FOR EFFECTIVE CURRENT INJECTION INTO TERAHERTZ MAGNON

(71) Applicants: Boris G. Tankhilevich, Walnut Creek, CA (US); Yehiel Korenblit, Netanya (IL)

(72) Inventors: Boris G. Tankhilevich, Walnut Creek, CA (US); Yehiel Korenblit, Netanya (IL)

(73) Assignee: MAGTERA, INC., Walnut Creek, CA (US)

( * ) Notice: Subject to any disclaimer, the term of this patent is extended or adjusted under 35 U.S.C. 154(b) by 55 days.

(21) Appl. No.: 14/088,448

(22) Filed: Nov. 25, 2013

(51) Int. Cl.  
*H01S 3/00* (2006.01)  
*H01S 3/0959* (2006.01)  
*H01S 3/04* (2006.01)  
*H01S 1/02* (2006.01)

(52) U.S. Cl.  
CPC .............. *H01S 3/0959* (2013.01); *H01S 3/0407* (2013.01); *H01S 1/02* (2013.01)

(58) Field of Classification Search  
CPC ........................................................ H01S 1/02  
USPC .................................. 359/342; 372/37, 43.01  
See application file for complete search history.

(56) References Cited

U.S. PATENT DOCUMENTS

| 7,430,074 | B2 | 9/2008 | Korenblit et al. |
| 7,508,578 | B2 | 3/2009 | Korenblit et al. |
| 8,031,397 | B1 | 10/2011 | Korenblit et al. |
| 8,427,740 | B1* | 4/2013 | Tankhilevich ............... 359/342 |
| 8,593,724 | B1 | 11/2013 | Korenblit et al. |
| 8,629,729 | B2* | 1/2014 | Hoppensteadt et al. ..... 331/94.1 |
| 2005/0242287 | A1* | 11/2005 | Hakimi .................... 250/363.09 |
| 2007/0263434 | A1* | 11/2007 | Dieny et al. .................... 365/171 |
| 2008/0152952 | A1* | 6/2008 | Santos et al. ............... 428/811.1 |

OTHER PUBLICATIONS

Korenblit et al. "Generation Of High-Frequency Magnons by NonEquilibrium Electrons Polarized Opposite To The Direction Of Magnetization", Soviet Physics, JETP, vol. 46(6), pp. 1167-1175, Dec. 1977.  
Vaks et al. "Spin Waves and Correlation Functions In A Ferromagnetic", Soviet Physics, JETP, vol. 53, pp. 647-655, 1967.  
Wurmehl et al. "Geometric, Electronic, and Magnetic Structure of Co2FeSi: Curie Temperature and Magnetic Moment Measurements and Calculations", The American Physical Society, Physical Review B 72, 184434, 2005.  
Noda et al. "Spin Waves in Heusler Alloys Pd2MnSn and Ni2MnSn", Journal of the Physical Society of Japan, vol. 40, No. 3, pp. 690-698, Mar. 1976.  
Tajima et al. "Spin Waves in a Heusler Alloys Cu2MnAl*", Journal of the Physical Society of Japan, vol. 43, No. 2, pp. 483-489, Aug. 1977.  
Khalili Amiri et al. "Switching Current Reduction Using Perpendicular Anisotropy in CoFeB-MgO Magnetic Tunnel Junctions", Applied Physics Letters, vol. 98, 112507, 2011.  
U.S. Appl. No. 13/043,470: Notice of Allowance and Fee(s) Due dated Jul. 30, 2013 by Examiner Eric L. Bolda.

* cited by examiner

*Primary Examiner* — Mark Hellner  
(74) *Attorney, Agent, or Firm* — Boris G. Tankhilevich

(57) ABSTRACT

An apparatus comprising a ferromagnetic conductive material including a magnon gain medium (MGM) and a tunnel junction coupled to the ferromagnetic conductive material are provided. The magnon gain medium (MGM) further comprises a conduction band that is split into two sub bands separated by an exchange energy gap, a first sub band having spin up, and a second sub band having spin down. The applied bias voltage is configured to shift the Fermi level of the external metallic contact with respect to the Fermi level of the ferromagnetic conductive material so that the injected electrons are configured to tunnel into the second sub band having spin down.

18 Claims, 2 Drawing Sheets

USING TUNNEL JUNCTION AND BIAS FOR EFFECTIVE CURRENT INJECTION INTO TERAHERTZ MAGNON

CROSS-REFERENCE TO RELATED APPLICATIONS

This is a continuation of the U.S. patent application Ser. No. 12/315,424, filed on Dec. 2, 2008, and entitled "TUNABLE TERAHERTZ GENERATOR USING A MAGNON GAIN MEDIUM WITH AN ANTENNA", now U.S. Pat. No. 7,986,454, which is a continuation-in-part of the U.S. patent application Ser. No. 12/290,527, filed on Nov. 1, 2008, and entitled "THREE LEVEL MAGNON LASER AT ROOM TEMPERATURES", now U.S. Pat. No. 8,031,397, which is a continuation-in-part of the U.S. patent application Ser. No. 11/701,284, filed on Jan. 31, 2007 now U.S. Pat. No. 7,508,578 and entitled "MAGNON LASER", which is a continuation-in-part of the parent U.S. patent application Ser. No. 11/481,197 filed on Jul. 3, 2006, now U.S. Pat. No. 7,430,074 "GENERATION OF TERAHERTZ WAVES".

TECHNICAL FIELD

The technology relates to magnon laser effect.

BACKGROUND

In the parent U.S. Pat. No. 7,430,074 "GENERATION OF TERAHERTZ WAVES" the generation of nonequilibrium magnons was disclosed. In the U.S. patent application Ser. No. 11/701,284, filed on Jan. 31, 2007 and entitled "MAGNON LASER", the generation of nonequilibrium magnons was described by using a general laser analogy. In the U.S. patent application Ser. No. 12/290,527, filed on Nov. 1, 2008, and entitled "MAGNON LASER AT ROOM TEMPERATURES", the generation of nonequilibrium magnons at room temperatures was disclosed by using special magnetic materials. In the U.S. patent application Ser. No. 13/043,470, filed on Mar. 9, 2011 and entitled "FOUR LEVEL MAGNON LASER AT ROOM TEMPERATURES", the generation of nonequilibrium magnons was described by using a four level laser analogy.

In the present patent application an efficient technique for injection of electrical current into sub band having spin opposite to the direction of magnetization of the ferromagnetic conductive material is disclosed.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus comprising a ferromagnetic conductive material including a magnon gain medium (MGM) and a tunnel junction coupled to the ferromagnetic conductive material is provided. The magnon gain medium (MGM) further comprises a conduction band that is split into two sub bands separated by an exchange energy gap, a first sub band having spin up, and a second sub band having spin down.

The apparatus further comprises an external metallic contact coupled to the tunnel junction.

The apparatus further comprises a bias voltage source applied to the external metallic contact.

An external power source is configured to inject electron current using the external metallic contact into the ferromagnetic conductive material by tunneling via the tunnel junction. The applied bias voltage is configured to shift the Fermi level of the external metallic contact with respect to the Fermi level of the ferromagnetic conductive material so that the injected electrons are configured to tunnel into the second sub band having spin down.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
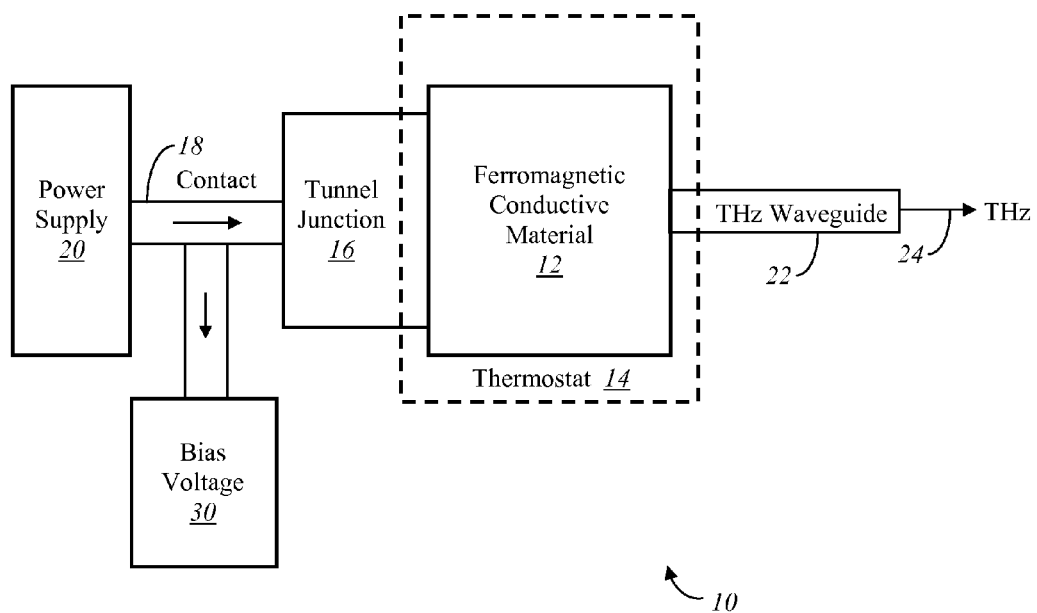
FIG. 1 depicts a block diagram of the apparatus of the present technology comprising a ferromagnetic conductive material, a tunnel junction, and a bias voltage applied to the contact.

In an embodiment of the present technology, FIG. 1 depicts a block diagram 10 of the apparatus comprising a ferromagnetic conductive material 12 further including a magnon gain medium (MGM) (not shown), a tunnel junction 16 coupled to the ferromagnetic conductive material 12, and a bias voltage 30 applied to the contact 18. The external power supply 20 injects electrons having both spins up and down via contact 18 and via the tunnel junction 16 into the ferromagnetic conductive material 12.

Figure 2:
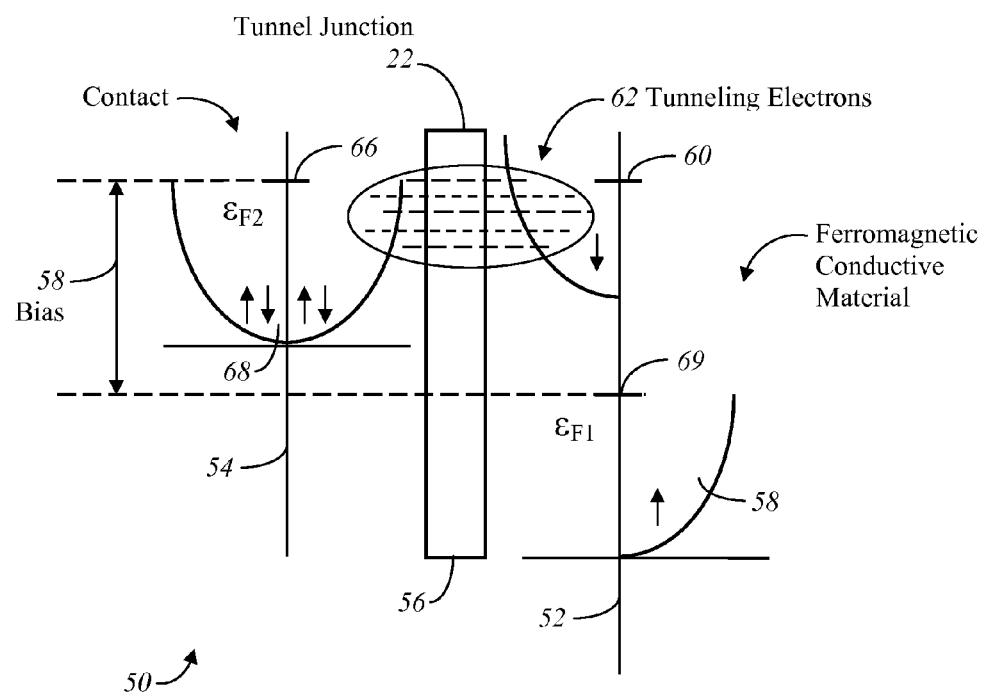
FIG. 2 illustrates shifting of the Fermi level of the external metallic contact with respect to the Fermi level of the ferromagnetic conductive material by applying a bias voltage so that the injected electrons are configured to tunnel into the second sub band having spin down for the purposes of the present technology.

In an embodiment of the present technology, as shown in the diagram 50 of FIG. 2, the magnon gain medium (MGM) further comprises a conduction band that is split into two sub bands separated by an exchange energy gap, a first sub band 58 having spin up, and a second sub band 60 having spin down.

In an embodiment of the present technology, FIG. 2 further illustrates the application of the bias voltage 58 used to shift the Fermi level 66 of the external metallic contact 54 with respect to the Fermi level 69 of the ferromagnetic conductive material 52 so that the injected electrons 62 are tunneling into the second sub band 60 having spin down.

In an embodiment of the present technology, the ferromagnetic conductive material (12 of FIG. 1) is selected from the group consisting of: a ferromagnetic semiconductor; a dilute magnetic semiconductor (DMS); a half-metallic ferromagnet (HMF); and a ferromagnetic conductor, with a gap in the density of states of the minority electrons around the Fermi energy.

Recently some dilute magnetic semiconductors (DMS), with Tc above room temperature, have been studied intensively. These are oxides doped with magnetic cations. The examples are: GaN, doping Mn-9%, Tc=940 K; AN, doping Cr-7%, Tc>600 K; TiO2 (anatase), doping Co-7%, Tc=650 K; SnO$_2$, doping Co-5%, Tc=650 K. These magnets can be used as a magnon gain medium (MGM) to generate nonequilibrium magnons and photons at room temperatures.

In an embodiment of the present technology, the half-metallic ferromagnet (HMF) is selected from the group consisting of a spin-polarized Heusler alloy; a spin-polarized Colossal magnetoresistance material; and CrO$_2$.

Half-metallic ferromagnets (HMF) are ferromagnetic conductors, with a gap in the density of states of the minority electrons around the Fermi energy, Ef. Thus, the electrons in these materials are supposed to be 100% spin polarized at Ef. Thermal effects and spin-orbital interactions reduce the electron polarization. However, the electron polarization is close to 100% in half-metallic ferromagnets with spin-orbital interaction smaller than the minority electron gap and at temperatures much lower than the Curie temperature Tc.

Half-metallic ferromagnets (HMF) form a quite diverse collection of materials with very different chemical and physical properties.

Chromium dioxide, CrO$_2$. Tc=390 K. Magnetic moment per Cr=2 μB. The polarization measured at low temperatures is close to 100%. There are some other known half-metallic ferromagnetic oxides, e.g. Sr$_2$FeMoO$_6$.

Heusler alloys. Most of the predicted HMF is Heusler alloys. In general, these are ternary X$_2$YZ-compounds, X and Y are usually transition metals and Z is a main group element. The most studied of them is NiMnSb: Tc=728 K, with magnetic moment close to 4 μB. Experiments show that NiMnSb is a half-metallic ferromagnet at low temperatures. But there is evidence that at T≈90 K a phase transition into a usual ferromagnetic state takes place, and it seems unlikely that NiMnSb is a half-metallic ferromagnet near room temperature.

There are many other Heusler alloys with half-metallic ferromagnet properties, like: (1) Co$_2$MnSi having Tc of 1034 K and magnetic moment of 5 μB; (2) Co$_2$MnGe having Tc of 905 K and magnetic moment close to 5 μB; and (3) Co$_2$MnSn having Tc of 826 K and magnetic moment of 5.4 μB; etc.

Colossal magnetoresistance materials: La$_{1-x}$Sr$_x$MnO$_3$ (for intermediate values of x) is presumably a half-metallic ferromagnet having Tc close to room temperature. Photoelectron emission experiments confirm the half-metallicity of La$_{0.7}$Sr$_{0.3}$MnO$_3$, with Tc=350 K. The polarization degree at T=40K is 100±5%, the gap for the minority spins is 1.2 eV.

In an embodiment of the present technology, the spin-polarized Heusler alloy is selected from the group consisting of Co$_2$FeAl$_{0.5}$Si$_{0.5}$; NiMnSb; Co$_2$MnSi; Co$_2$MnGe; Co$_2$MnSn; Co$_2$FeAl and Co$_2$FeS.

It has been shown recently (S. Wurmehl et al., *PRB* 72, 184434 (2005)), that the alloy with the highest magnetic moment and Tc is Co$_2$FeSi having Tc of 1100 K (higher than for Fe), and having magnetic moment per unit cell of 6 μB. The orbital contribution to the moments is small, while the exchange gap is large, of order 2 eV. Therefore, the effect of thermal fluctuations and spin-orbit interaction on the electron polarization is negligible. One should expect, therefore, that the electrons in Co$_2$FeSi are polarized at high temperatures, sufficiently close to Tc. Indeed, according to the experiment the magnetic moment at 300 K is the same as at 5 K.

Note that HMF, as well as ferromagnetic semiconductors, differ from "normal" metallic ferromagnets by the absence of one-magnon scattering processes. Therefore, spin waves in HMF, as well as in magnetic insulators, are well defined in the entire Brillouin zone. This was confirmed by neutron scattering experiments performed on some Heusler alloys. For references, please see: (1) Y. Noda and Y. Ishikawa (*J. Phys. Soc. Japan* v. 40, 690, 699 (1976)) have investigated the following Heusler alloys: Pd$_2$MnSn and Ni$_2$MnSn. (2) K. Tajima et al. (*J. Phys. Soc. Tap.* v. 43, 483 (1977)), have investigated Heusler alloy Cu$_2$MnAl.

Thus, all these above disclosed magnets can be used as a magnon gain medium (MGM) to generate nonequilibrium magnons and photons at room temperatures for the purposes of the present technology.

Hence, the magnon laser effect (disclosed in the parent U.S. Pat. No. 7,430,074 "GENERATION OF TERAHERTZ WAVES") can be observed (in at least some of the referenced above half-metals) at room temperatures.

However, in half-metals the spin-up electron with energy larger than the exchange gap will interact with the spin-up electrons with energy smaller than the gap. Since the number of the spin-up electrons is large (as compared to the number of spin-up electrons in ferromagnetic semiconductors) this interaction should lead to the fast thermalisation of high-energy electrons, which will prevent the reverse process of absorption of magnons by electrons with spin-up, which is crucial for existence of the magnon laser.

In other words, the electron bath in half-metallic ferromagnets could play the same role as the optical phonons in ferromagnetic semiconductors. However, in half-metallic ferromagnetic oxides the interaction of the electrons with spin-up with optical phonons could also play an important role.

The following disclosure is focused on magnon laser at room temperatures that can be observed in half-metallic ferromagnets, in which only the states in the lower subband are occupied in equilibrium, i.e. the electrons are polarized.

As was shown in the parent U.S. Pat. No. 7,430,074 "GENERATION OF TERAHERTZ WAVES", a nonequilibrium electron put in the upper sub band 60 (of FIG. 2) with spin down rapidly emits a magnon (not shown), with a large wave vector $q \approx \hbar^{-1} (2m\Delta)^{1/2}$, where m is the electron effective mass. It follows from the energy and momentum conservation laws that if the energy of this electron, $\epsilon_p$, measured from the bottom of the spin down subband is much smaller than $\Delta$, the wave vector of the emitted magnon, q lies in the interval $q_1 \leq q \leq q_2$, where $q_{1,2} = \hbar^{-1} (p_0 \pm p)$, $p_0 = (2m \Delta)^{1/2}$, $p = (2m \epsilon_p)^{1/2} \ll p_0$. The frequency of these magnons may be in the Terahertz region.

As was also shown in the parent U.S. Pat. No. 7,430,074 "GENERATION OF TERAHERTZ WAVES", the ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}*$. $N(\vec{q})$ increases with the increase of the electron injection, and because of the simulated emission of magnons, the function $N(\vec{q})$ grows most rapidly at $\vec{q}$ close to $\vec{q}*$.

When the injection reaches some critical value, $N(\vec{q}*)$ starts to increase very fast with the increase of the electron injection. At some conditions the generation of magnons with $\vec{q}=\vec{q}*$ becomes avalanche-like, and the magnon system becomes unstable. For more details, please see U.S. Pat. No. 7,430,074 "GENERATION OF TERAHERTZ WAVES", and equations given in the U.S. Pat. No. 7,430,074 that is reproduced below.

Basic Equations for Magnon Generation

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Soy. Phys.—JETP, 46, 1167 (1977). They read $$[1+N(\vec{q})]\Gamma_e(\vec{q})]-[N(\vec{q})-N^{(0)}(\vec{q})]\Gamma_m(\vec{q})=0$$

$$f_\downarrow(\vec{p})\gamma_{em}(\vec{p})=g(\epsilon_p). \quad \text{(Eqs. 1)}$$

Here $\Gamma_e(\vec{q})$ is the rate of relaxation of magnons in collisions with electrons $$\Gamma_e(\vec{q})=4\pi\hbar^{-1}I^2Sv_0\int d^3p(2\pi\hbar)^{-3}\delta(\gamma_\uparrow(\vec{p}-\hbar\vec{q})|\epsilon_{\vec{p}\downarrow}-\hbar\omega_{\vec{q}}-\epsilon_{\vec{p}-\hbar\vec{q},\uparrow})f_\downarrow(\vec{p}), \quad \text{(Eq. 2)}$$

where $v_0$ is the unit cell volume.

$\gamma_{em}$ is the electron-magnon relaxation rate:

$$\gamma_{em}(\vec{p})=4\pi\hbar^{-1}I^2Sv_0\int d^3q(2\pi\hbar)^{-3}\delta(\gamma_\uparrow(\vec{p}-\hbar\vec{q})|\epsilon_{\vec{p}\downarrow}-\hbar\omega_{\vec{q}}-\epsilon_{\vec{p}-\hbar\vec{q},\uparrow})(1+N(\vec{q})), \quad \text{(Eq. 3)}$$

The smeared δ-function, $\delta(\gamma|\epsilon)$, takes into account the finite lifetime of the electrons in the final state, caused by the interaction with electrons with spin-up (or by the interaction with optical phonons). In the case of electron thermalisation due to interaction with optical phonons $$\delta(\gamma|\varepsilon)=\frac{1}{\pi}\frac{\hbar\gamma}{(\varepsilon^2+\hbar^2\gamma^2)} \quad \text{(Eq. 4)}$$

The rate $\gamma_\uparrow(p,\epsilon_p)$ is the known electron damping rate due to the emission of longitudinal optical phonons. For electrons with energy $\gamma_p$ close to $\Delta$, this rate is given by $$\gamma_\square(\epsilon_p)=(\pi/2)\alpha\Omega(\Omega/\Delta)^{1/2}\ln(4\Delta/\Omega)<<\Delta. \quad \text{(Eq. 5)}$$

Here $\Omega$ is the energy of an optical phonon, and $\alpha$ is the strength of the electron-phonon interaction.

If for half-metals (HM) the rate of electron damping $\gamma^{ee}_\uparrow(\epsilon_p)$ is mainly due to interaction with equilibrium electrons, it can be shown that $\gamma^{ee}_\square(\epsilon_p)$ is much smaller than $\Delta$:

$$\gamma^{ee}_\square(\epsilon_p)<<\Delta. \quad \text{(Eq. 5A)}$$

The function $g(\epsilon)$ is the generation function of electrons, with spin down. We shall treat it as a δ-function $$g(\epsilon_p)=g_0\epsilon\delta(\epsilon-\epsilon_p). \quad \text{(Eq. 6)}$$

We suppose in what follows that the energy $\epsilon$ is small, $\epsilon<<\Delta$.

The second term in the l.h.s. in the first of Eqs.(1) describes the relaxation of nonequilibrium magnons in collisions with equilibrium ones, under the assumption that $N(\vec{q})$, is close to its equilibrium value, $$N^{(0)}(\vec{q})=[e^{(\hbar\omega_q/kT)}-1]^{-1}. \quad \text{(Eq. 7)}$$

$\Gamma_m(\vec{q})$ is the magnon-magnon relaxation rate. From Eqs. (1) we obtain the following integral equation for $N(\vec{q})$, $$N(\vec{q})=(N^0(\vec{q})+\Gamma_e(\vec{q})/\Gamma_m(\vec{q}))(1-\Gamma_e(\vec{q})/\Gamma_m(\vec{q}))^{-1}, \quad \text{(Eq. 8)}$$

where $$\Gamma_e(\vec{q})=g_0\epsilon\int d^3p\delta(\gamma_\uparrow(\vec{p}-\hbar\vec{q})|\epsilon_{\vec{p}\downarrow}-\hbar\omega_{\vec{q}}-\epsilon_{\vec{p}-\hbar\vec{q},\uparrow})Z^{-1}(\vec{p}), \quad \text{(Eq. 9)}$$

and $$Z(\vec{p})=\int d^3q\delta(\gamma_\uparrow(\vec{p}-\hbar\vec{q})|\epsilon_{\vec{p}\downarrow}-\hbar\omega_{\vec{q}}-\epsilon_{\vec{p}-\hbar\vec{q},\uparrow})(1+N(\vec{q})). \quad \text{(Eq. 10)}$$

Eq. (8) is formally reminiscent of the expression for the magnon distribution function under conditions of parametric injection. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the injection $g(\epsilon_p)$ but also by a certain average (10) over the magnon distribution function. The behavior of $N(\vec{q})$ is therefore different from that in the case of parametric injection.

$N(\vec{Q})$ for Strong Injection Isotropic Case.

Let us assume for simplicity that the magnon and electron spectra are isotropic. Then $\Gamma_e(q)$ and $\Gamma_m(q)$ do not depend on the direction of $\vec{q}$. The relaxation rate $\Gamma(q)$ is usually a power function of q, and it can be written as $$\Gamma_m(q)=\Gamma_m(p_0)(\hbar q/p_0)^t. \quad \text{(Eq. 11)}$$

More specifically, if $\Gamma_m(q)$ is determined by magnon-magnon exchange scattering, then t=4 for magnons, with energy $\hbar\omega(q_0)$ larger than kT, and t=3 for magnons, with energy $\hbar\omega(q_0)$ smaller than kT.

The strong injection regime sets in, when $g_0$ exceeds a critical value $G_c$. If the damping of electrons is due to interaction with optical phonons (and is less than $(\epsilon\Delta)^{1/2}$), this critical value is given by $$G_c=2g_c/(t+1),$$

$$g_c=(\Delta/\epsilon)^{3/2}\Gamma_m(q_0)[1+N^{(0)}(q_0)]. \quad \text{(Eqs. 12)}$$

At $g_0>G_c$ the function $N(q)$ increases exponentially with injection $$N(q)=[1+N^{(0)}(q_0)](p_0/2p_e(t+1))\exp(g_0/G_c), \quad \text{(Eq. 13)}$$

if q falls into the smooth region $$p_0-p_e\leq\hbar q\leq p_0-p_e+\delta\hbar q,$$

$$\delta\hbar q=2p_e\exp(-g_0/G_c), \quad \text{(Eqs. 14)}$$

while N(q) with wave vectors outside of the above-given range does not depend on the injection. Thus, under sufficiently strong injection the magnon distribution function has a sharp peak at $\hbar q \approx p_0 - p_\epsilon$.

Let us define the number of electrons, $\beta$, injected per second per unit cell as:

$$\beta = \nu_0 (2\pi\hbar)^{-3} \int d^3 p\, g(\epsilon_p). \quad \text{(Eq. 15)}$$

One gets for the injection given by Eq. (6)

$$\beta = (\nu_0 \epsilon^{3/2} m^{3/2} g_0 / 2^{1/2} \pi^2 \hbar^3) \quad \text{(Eq. 16)}$$

and the critical injection $\beta_c$, with $g_0 = G_c$ is $$\beta_c = (\nu_0 q^3_0 / (2(t+1)\pi^2)) \Gamma_m(q_0)[1 + N^{(0)}(q_0)]. \quad \text{(Eq. 17)}$$

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for T/Tc≈0.2, and $\hbar \omega(q_0) > kT$, $N^{(0)}(q_0) \ll 1$: $\Gamma_m \approx (10^8 - 10^9)$ sec$^{-1}$.

Thus, it follows from Eq. (17) the estimate $\beta_c \approx (10^5 - 10^7)$ sec$^{-1}$, and we took into account that $N^{(0)}(q_0)$ is small.

The physical meaning of the critical injection $G_c$ can be understood as follows. The ratio $\Gamma_e/\Gamma_m$ of the rate of generation of the magnons to the rate of their relaxation reaches its maximum value at $\hbar q = p_0 - p_\epsilon$ and has its minimum at $\hbar q = p_0 + p_\epsilon$, i.e. there is an excess generation on the left end of the interval in comparison with the right end. Stimulated emission causes the increase of this asymmetry. Nonlinear generation begins when the difference between the number of nonequilibrium magnons at the ends of the generation interval becomes equal to the number of equilibrium magnons, if $N^{(0)} > 1$. On the other hand, nonlinear generation begins when the difference between the number of nonequilibrium magnons at the ends of the generation interval becomes equal to 1, if the opposite inequality ($N^{(0)} < 1$) holds.

In an embodiment of the present technology, referring still to FIG. 1, as was disclosed above, the apparatus 10 includes the tunnel junction 16.

In an embodiment of the present technology, the tunnel junction 16 is selected from the group consisting of a thin insulating layer between the contact 18 and the ferromagnetic conductive material 12, or a bias between the contact 18 and the ferromagnetic conductive material 12.

In electronics, a tunnel junction is a barrier, such as a thin insulating layer or electric potential, between two electrically conducting materials.

Electrons (or quasi-particles) pass through the barrier by the process of quantum tunneling. Classically, the electron has zero probability of passing through the barrier. However, according to quantum mechanics, the electron has non-zero wave amplitude in the barrier, and hence it has some probability of passing through the barrier.

Tunneling is often explained using the Heisenberg uncertainty principle and the wave-particle duality of matter. Purely quantum mechanical concepts are central to the phenomenon, so quantum tunneling is one of the novel implications of quantum mechanics.

In an embodiment of the present technology, referring to FIG. 2, the tunnel junction 22 is used to separate two electronic systems from each other: the electronic system of the ferromagnetic conductive material 52 and the electronic system of contact 54.

In an embodiment of the present technology, as shown in FIG. 2, because the tunnel junction 22 separates two electronic systems of the ferromagnetic conductive material 52 and of the electronic system of contact 54, the external boas voltage 56 can be applied to the contact 54 to shift its Fermi level $E_{F2}$ 66 with respect to the Fermi level $E_{F1}$ 69 of the ferromagnetic conductive material 52.

In an embodiment of the present technology, as shown in FIG. 2, the electrons injected into the ferromagnetic material 52 via tunnel junction 22 are tunneling (62) into the upper sub band with spin down 60, flip their spin and emit magnons by entering the sub band with spin up 58 thus effectively initiating the magnon lasing process disclosed above.

As was disclosed in the parent U.S. Pat. No. 7,430,074 "GENERATION OF TERAHERTZ WAVES", the electron-magnon frequency $\gamma_{em}$ is of order $3 \times 10^{12} - 10^{13}$ sec$^{-1}$. The velocity of electrons with energy of order of $10^{-2}\Delta$ is $5 \times 10^6 - 10^7$ cm×sec$^{-1}$. This gives the mean free path of electrons with respect to magnon emission as: $1 \cdot 10^{-6}$ cm. Thus, all electrons entering a sample (including a magnon gain medium) across a selected side will emit magnons at this distance from that side. Therefore, only the region of width l is active, and we get for the current density $j = N_e \times l$ electrons/sec×cm$^2$. The charge of an electron is $1.6 \times 10^{-19}$ Q. Taking into account that $1 \times Q/\text{sec} = 1$ A, we finally get: $j = 10^4 - 10^5$ A/cm$^2$. Current densities of order $10^5 - 10^6$ A/cm$^2$ are easy to achieve in semiconductors. In a pulse regime one can obtain current densities j as high as: $j = 10^9$ A/cm.

The current densities of $10^7$ A/cm$^2$ were achieved recently in the CoFeB—MgO magnetic tunnel junctions. For references, please see: P. Khalili Amiri, Z. M. Zeng, J. Langer, H. Zhao, G. Rowlands, Y.-J. Chen, I. N. Krivorotov, J.-P. Wang, H. W. Jiang, J. A. Katine, Y. Huai, K. Galatsis, 1 and K. L. Wang, (*Applied Physics Letters* 98, 112507, 2011)

Thus, achieving the threshold current density for the threshold of the magnon lasing in the proposed apparatus 10 of FIG. 1 is feasible.

In an embodiment of the present technology, referring still FIG. 1, the apparatus 10 further includes a thermostat 14 configured to maintain temperature of the ferromagnetic conductive material 12 below the Curie temperature.

For example, in case the ferromagnetic conductive material 12 comprises the ferromagnetic semiconductor EuO doped with Gd and having the Curie temperature of about 120 K, the thermostat 14 (comprising liquid Nitrogen having the boiling temperature of 77 K) is needed to keep the operating temperature substantially below 120 K.

In an embodiment of the present technology, referring still FIG. 1, wherein electrons injected into the ferromagnetic conductive material 14 via the tunnel junction 16 generate non-equilibrium magnons; and wherein interaction between the non-equilibrium magnons causes generation of electromagnetic radiation; the apparatus 10 further comprises an electromagnetic waveguide (not shown) coupled to the ferromagnetic conductive material 12 and configured to output the electromagnetic radiation.

In an embodiment of the present technology, referring still FIG. 1, wherein electrons injected into the ferromagnetic conductive material 14 via the tunnel junction 16 generate non-equilibrium magnons; and wherein interaction between the non-equilibrium magnons causes generation of THz electromagnetic radiation; the apparatus 10 further comprises a THz electromagnetic waveguide (not shown) coupled to the ferromagnetic conductive material 12 and configured to output the THz electromagnetic radiation.

The above discussion has set forth the operation of various exemplary systems and devices, as well as various embodiments pertaining to exemplary methods of operating such systems and devices. In various embodiments, one or more steps of a method of implementation (calculating the optimum voltage bias, for example) are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus comprising:
a ferromagnetic conductive material including a magnon gain medium, said magnon gain medium further comprising:
a conduction band that is split into two sub bands separated by an exchange energy gap, a first sub band having spin up, and a second sub band having spin down, and
a tunnel junction coupled to said ferromagnetic conductive material; wherein electrons are injected into said ferromagnetic conductive material from an external metallic contact by tunneling via said tunnel junction.

2. The apparatus of claim 1 further comprising:
said external metallic contact coupled to said tunnel junction; wherein an external power source is configured to inject electron current using said external metallic contact into said ferromagnetic conductive material by tunneling via said tunnel junction.

3. The apparatus of claim 2 further comprising:
a bias voltage source applied to said external metallic contact; wherein said applied bias voltage is configured to shift the Fermi level of said external metallic contact with respect to the Fermi level of said ferromagnetic conductive material.

4. The apparatus of claim 1, wherein said ferromagnetic conductive material is selected from the group consisting of:
a ferromagnetic semiconductor; a dilute magnetic semiconductor (DMS); a half-metallic ferromagnet (HMF); and a ferromagnetic conductor, with a gap in the density of states of the minority electrons around the Fermi energy.

5. The apparatus of claim 4, wherein said half-metallic ferromagnet (HMF) is selected from the group consisting of:
a spin-polarized Heusler alloy; a spin-polarized Colossal magnetoresistance material; and $CrO_2$.

6. The apparatus of claim 5, wherein said spin-polarized Heusler alloy is selected from the group consisting of:
$Co_2FeAl_{0.5}Si_{0.5}$; NiMnSb; $Co_2MnSi$; $Co_2MnGe$; $Co_2MnSn$; $Co_2FeAl$ and $Co_2FeS$.

7. The apparatus of claim 1, wherein said tunnel junction is selected from the group consisting of:
a thin insulating layer between said contact and said ferromagnetic conductive material; and a bias between said contact and said ferromagnetic conductive material.

8. The apparatus of claim 1 further comprising:
a thermostat, wherein said ferromagnetic conductive material is placed in said thermostat, and wherein said thermostat is configured to maintain temperature of said ferromagnetic conductive material below a critical temperature.

9. The apparatus of claim 1, wherein electrons injected into said ferromagnetic conductive material via said tunnel junction generate non-equilibrium magnons; and wherein interaction between said non-equilibrium magnons causes generation of electromagnetic radiation; said apparatus further comprising:
an electromagnetic waveguide coupled to said ferromagnetic conductive material and configured to output said electromagnetic radiation.

10. The apparatus of claim 1, wherein electrons injected into said ferromagnetic conductive material via said tunnel junction generate non-equilibrium magnons; and wherein interaction between said non-equilibrium magnons causes generation of THz electromagnetic radiation; said apparatus further comprising:
a THz electromagnetic waveguide coupled to said ferromagnetic conductive material and configured to output said THz electromagnetic radiation.

11. A method for generation of nonequilibrium magnons by using an apparatus comprising a ferromagnetic conductive material having a conduction band that is split into two sub bands separated by an exchange energy gap, a first sub band having spin up, and a second sub band having spin down; a tunnel junction coupled to said ferromagnetic conductive material; and an external metallic contact coupled to said tunnel junction; said method comprising:
(A) applying bias voltage to shift a Fermi level of said external metallic contact with respect to said exchange energy gap of said ferromagnetic conductive material; and
(B) injecting said electron current provided by said power source via said tunnel junction into said second sub band having spin down;
wherein said injected electrons having spin down emit non-equilibrium magnons.

12. The method of claim 11 further comprising:
(C) generating electromagnetic radiation caused by interaction between said nonequilibrium magnons.

13. The method of claim 12, wherein said step (C) further comprised:
 (C1) generating THz electromagnetic radiation caused by interaction between said nonequilibrium magnons.

14. The method of claim 11, wherein said step (A) further comprises:
 (A1) selecting said ferromagnetic conductive material from the group consisting of:
 a ferromagnetic semiconductor; a dilute magnetic semiconductor (DMS); a half-metallic ferromagnet (HMF); and a ferromagnetic conductor, with a gap in the density of states of the minority electrons around the Fermi energy.

15. The method of claim 14, wherein said step (A1) further comprises:
 (A1, 1) selecting said half-metallic ferromagnet (HMF) from the group consisting of:
 a spin-polarized Heusler alloy; a spin-polarized Colossal magnetoresistance material; $CrO_2$; $Sr_2FeMoO_6$; and $Fe_3O_4$.

16. The method of claim 14, wherein said step (A1, 1) further comprises:
 (A1, 1, 1) selecting said spin-polarized Heusler alloy from the group consisting of:
 $Co_2FeAl_{0.5}Si_{0.5}$; NiMnSb; $Co_2MnSi$; $Co_2MnGe$; $Co_2MnSn$; and $Co_2FeS$.

17. The method of claim 11 further comprising:
 (D) using an electromagnetic waveguide coupled to said ferromagnetic conductive material to output said electromagnetic radiation caused by interaction between said nonequilibrium magnons.

18. The method of claim 11 further comprising:
 (E) using an electromagnetic THz waveguide coupled to said ferromagnetic conductive material to output said THz electromagnetic radiation caused by interaction between said nonequilibrium magnons.

\* \* \* \* \*